(12) United States Patent
Carlsgaard et al.

(10) Patent No.: US 7,522,219 B2
(45) Date of Patent: Apr. 21, 2009

(54) VIDEO SIGNAL PROCESSING SYSTEM WITH AUXILIARY INFORMATION PROCESSING CAPABILITY

(75) Inventors: Eric Stephen Carlsgaard, Zionsville, IN (US); Joseph Wayne Forler, Indianapolis, IN (US); William J. Testin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 441 days.

(21) Appl. No.: 10/153,456

(22) Filed: May 22, 2002

(65) Prior Publication Data

US 2002/0186320 A1 Dec. 12, 2002

Related U.S. Application Data

(60) Provisional application No. 60/296,318, filed on Jun. 6, 2001.

(51) Int. Cl.
H04N 9/74 (2006.01)
H04N 7/00 (2006.01)
H04N 11/00 (2006.01)

(52) U.S. Cl. .................. 348/584; 348/465; 348/468; 348/474; 348/556; 348/563; 348/569; 348/598

(58) Field of Classification Search ............ 348/465, 348/468, 473–474, 556, 554, 563–566, 569, 348/584, 588, 597, 598; H04N 9/74, 5/74
See application file for complete search history.

(56) References Cited

U.S. PATENT DOCUMENTS

| 4,800,426 | A | | 1/1989 | Glenn |
| 5,287,189 | A | * | 2/1994 | Ersoz et al. ........... 348/588 |
| 5,313,303 | A | * | 5/1994 | Ersoz et al. ........... 348/439.1 |
| 5,347,318 | A | * | 9/1994 | Kobayashi et al. ........ 348/556 |
| 5,351,087 | A | * | 9/1994 | Christopher et al. ...... 348/441 |
| 5,453,796 | A | * | 9/1995 | Duffield et al. .......... 348/565 |
| 5,461,427 | A | | 10/1995 | Duffield et al. |
| 5,512,954 | A | | 4/1996 | Shintani |
| 5,602,598 | A | * | 2/1997 | Shintani ................ 348/565 |

(Continued)

FOREIGN PATENT DOCUMENTS

EP 0 536428 A1 9/1991

(Continued)

*Primary Examiner*—Brian P Yenke
(74) *Attorney, Agent, or Firm*—Robert D. Shedd; Joseph J. Opalach; Brian J. Cromarty

(57) ABSTRACT

A system as described herein enables a user to access auxiliary information when viewing an enhanced performance television signal or program. Particularly, a television signal system is operative, configured, and/or enabled to allow a user to access and/or utilize auxiliary information when viewing a high definition or progressive-scan television signal. Briefly, an exemplary television signal system receives the auxiliary information/data (e.g. closed caption data) on a selected interlaced standard definition input, processes the auxiliary data, and combines or overlays the auxiliary data with a television (video) signal received on a selected input that does not have its own embedded auxiliary information/data. More particularly, an exemplary television signal system such as described herein involves using closed caption (CC) data from a standard definition signal, processing the CC data, and overlaying the CC data at a video rate of a higher definition signal selected for viewing that does not carry its own embedded closed caption data.

24 Claims, 4 Drawing Sheets

U.S. PATENT DOCUMENTS

| | | | | |
|---|---|---|---|---|
| 5,671,019 | A * | 9/1997 | Isoe et al. | 348/565 |
| 5,708,475 | A | 1/1998 | Hayashi et al. | |
| 5,726,715 | A * | 3/1998 | Endress | 348/565 |
| 5,907,369 | A * | 5/1999 | Rumreich et al. | 348/566 |
| 5,978,046 | A * | 11/1999 | Shintani | 348/589 |
| 5,995,160 | A * | 11/1999 | Rumreich | 348/564 |
| 6,018,369 | A * | 1/2000 | Patterson | 348/461 |
| 6,055,023 | A * | 4/2000 | Rumreich et al. | 348/553 |
| 6,097,441 | A * | 8/2000 | Allport | 348/552 |
| 6,108,044 | A * | 8/2000 | Shin | 348/555 |
| 6,307,597 | B1 * | 10/2001 | Patton et al. | 348/565 |
| RE37,501 | E * | 1/2002 | Song | 348/564 |
| 6,359,580 | B1 * | 3/2002 | Morrison | 348/731 |
| 6,373,527 | B1 * | 4/2002 | Lee | 348/564 |
| 6,388,700 | B1 * | 5/2002 | Beyers et al. | 348/571 |
| 6,532,041 | B1 * | 3/2003 | Monta et al. | 348/468 |
| 6,556,251 | B1 * | 4/2003 | Sorensen | 348/564 |
| 6,570,579 | B1 * | 5/2003 | MacInnis et al. | 345/629 |
| 6,741,293 | B1 * | 5/2004 | Obuchi | 348/554 |
| 6,766,100 | B1 * | 7/2004 | Komar et al. | 386/46 |
| 6,833,874 | B2 * | 12/2004 | Ozaki et al. | 348/565 |
| 6,977,691 | B1 * | 12/2005 | Middleton et al. | 348/473 |
| 7,061,542 | B1 * | 6/2006 | Ikeguchi | 348/558 |
| 2001/0021998 | A1 * | 9/2001 | Margulis | 725/81 |
| 2002/0101537 | A1 * | 8/2002 | Basson et al. | 348/465 |
| 2002/0113906 | A1 * | 8/2002 | Katoh | 348/729 |
| 2003/0133043 | A1 * | 7/2003 | Carr | 348/563 |

FOREIGN PATENT DOCUMENTS

| | | |
|---|---|---|
| EP | 0701367 A2 | 3/1996 |
| JP | 3159487 | 7/1991 |
| JP | 2217085 | 8/1991 |
| JP | 3201880 | 9/1991 |
| WO | WO00/16987 | 8/2000 |
| WO | WO 00/46987 | 8/2000 |

* cited by examiner

VIDEO SIGNAL PROCESSING SYSTEM WITH AUXILIARY INFORMATION PROCESSING CAPABILITY

This non-provisional U.S. patent application claims priority to and/or the benefit of provisional U.S. patent application Ser. No. 60/296,318 filed Jun. 6, 2001, entitled Video Signal Processing System With Auxiliary Information Processing Capability.

FIELD OF THE INVENTION

The present invention relates to television signal processing and, more particularly, to processing of auxiliary information of a television signal.

BACKGROUND OF THE INVENTION

Video signal processing systems may include the capability to receive and process various types of signals. For example, certain television signal processing apparatus (which may be a device including a display device, e.g., a television set, or may not include a display device, e.g., a set-top box) may provide for receiving and processing both an enhanced definition television signal, such as a high-definition television (HDTV) signal or progressive-scan type of signal (collectively, "enhanced performance television signal"), and may also provide for processing composite video or other standard definition (480-lines, interlaced) television (SDTV) signals. Usually, the user of a video system capable of processing HD/progressive-scan television signals would prefer to view a television program via an HD signal so as to enjoy the improved picture quality possible with HDTV signal processing.

However, use of an enhanced-performance video signal, such as HDTV or progressive scan signals, may make certain features common to standard definition televisions difficult or impossible to use. For example, many televisions include the capability to receive and decode auxiliary information that may be included in a television signal. Specific examples of such auxiliary information include teletext data, closed caption data, program guide data, and the like. Most analog television signals include such auxiliary information in a portion of the signal that does not usually carry programming information, e.g., the vertical blanking interval (VBI) of an NTSC signal. Auxiliary information may also be included in digital television signals by, for example, dedicating a particular stream of digital data packets to the auxiliary information data.

However, not all enhanced performance or HDTV signals include auxiliary information and, therefore, a user may be unable to use a feature such as closed captioning when viewing an HDTV program in the same way that he could for a NTSC program. That is, some of the new video signal interfaces, e.g., progressive scan and high definition video, do not have embedded auxiliary information such as closed caption data. So, the user who wants the improved video performance offered by the new video signal interfaces cannot have both the improved video performance and auxiliary information.

SUMMARY OF THE INVENTION

A system as described herein enables a user to access auxiliary information when viewing an enhanced performance television signal or program. Particularly, a television signal system is operative, configured, and/or enabled to allow a user to access and/or utilize auxiliary information when viewing a high definition or progressive-scan television signal.

A television signal system is provided that includes a television signal processing apparatus. The television signal processing apparatus includes a first processor in communication with a first television signal input and operative to process a television signal of a first format to provide a signal representing a television program included in the television signal of the first format. The television signal processing apparatus also includes a second processor in communication with a second television signal input and operative to process a television signal of a second format to obtain auxiliary information associated with the television program. A combiner, in communication with the first and second processors, is operative to combine the auxiliary information with the signal representing a television program to provide a signal representing a displayable image including the television program and auxiliary information.

A method utilized by the television signal system/apparatus involves processing a television signal of a first format for providing a signal representing a television program included in the television signal of the first format, processing a television signal of a second format to obtain auxiliary information associated with the television program, and combining the auxiliary information from the television signal of the second format with the signal representing the television program to produce a combined television signal representing a displayable image that includes the television program and the auxiliary information.

An exemplary television signal system receives the auxiliary information/data (e.g. closed caption data) on a selected interlaced standard definition input, processes the auxiliary data, and combines or overlays the auxiliary data with a television (video) signal received on a selected input that does not have its own embedded auxiliary information/data. More particularly, an exemplary television signal system such as described herein involves using closed caption (CC) data from a standard definition signal, processing the CC data, and overlaying the CC data at a video rate of a higher definition signal selected for viewing that does not carry its own embedded closed caption data.

Both the standard definition video signal (e.g., composite video) and the higher definition video signal (e.g., digital video interface-DVI) are coupled from respective sources to a television signal processing apparatus/monitor. When an enhanced performance television signal, such as an HD signal, is selected for display, a corresponding standard definition (e.g. composite) video signal having closed caption data (i.e. auxiliary data) is also selected and provided to a closed caption processor of the television signal processing apparatus/monitor. The closed caption processor then interprets the CC data and generates a video data signal at the same rate as the HD signal. The data signal is then overlaid according to a control signal also generated by the closed caption processor. The combined signal is provided to a television signal display.

Control of the input signal selection and routing may be done with a default set-up, e.g., when an enhanced performance television signal input is selected, standard definition (e.g. composite) input 1 is selected for auxiliary data (e.g. closed caption data). Alternatively, a user-controlled set-up menu may be provided that would allow each progressive or high definition (enhanced performance) input to be paired with a standard definition input for auxiliary data. The system controller would then route the auxiliary data to the auxiliary data processor for each video input with embedded auxiliary data.

The auxiliary data processor interprets the auxiliary data according to auxiliary data standards. However, after data-appropriate text, color and placement information for the auxiliary data is determined, the system transforms the data from the 480-line progressive or 1080-line interlaced. One implementation of the data transformation processor is an on-screen display (OSD) generator that is slaved to the selected external input. Horizontal and vertical synchronizing signals are extracted from the external signal and input into the OSD generator. The horizontal and vertical synchronizing signals force OSD generator output to conform to the input. One aspect of such an OSD generator is that the generator is flexible as to either the size or spacing of the auxiliary data (e.g. text in the case of closed caption data) to be displayed.

The auxiliary data processor knows where on the screen the auxiliary data is supposed to be placed and, therefore, along with the graphics video output, the auxiliary data processor also generates a fast switch control signal that forces the overlay switch to insert the auxiliary data over the selected higher definition video. For example, if closed caption (auxiliary) data was to be inserted from lines 180-200 on field one and lines 442-462 on field two in the standard definition image, it would need to use lines 378-422 on field one and lines 940-984 on field two of the 1080-line interlaced image. Similar transformations would occur for the horizontal position.

BRIEF DESCRIPTION OF THE DRAWINGS

The above-mentioned and other features and advantages of this invention, and the manner of attaining them, will become more apparent and the invention will be better understood by reference to the following description of embodiment(s) of the invention taken in conjunction with the accompanying drawings, wherein.

Corresponding reference characters indicate corresponding parts throughout the several views.

DETAILED DESCRIPTION

Figure 1:
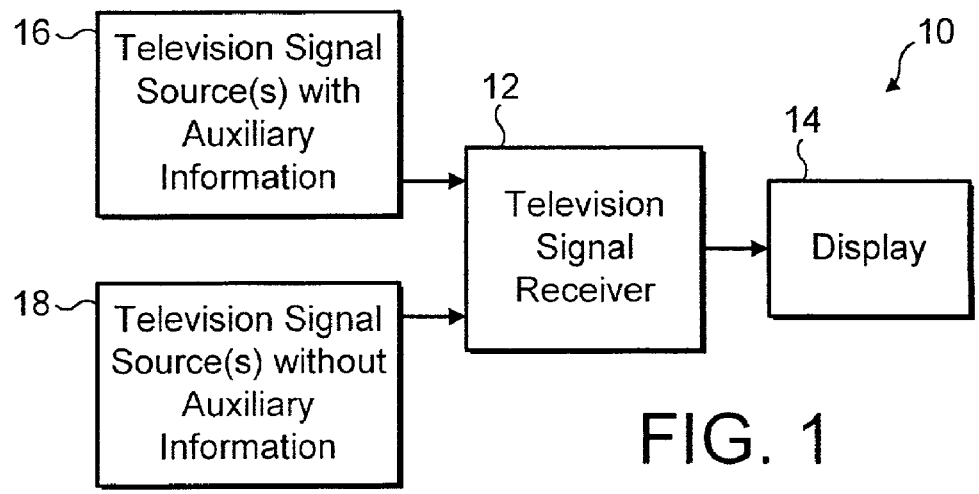
FIG. 1 is a simplified block diagram of a television signal processing system in accordance with the principles of the subject invention.

Referring now to the drawings and, more particularly to FIG. 1, there is depicted an exemplary television signal system generally designated 10. The television signal system 10 includes a television signal processing apparatus or receiver 12 and a display or monitor 14 in communication with the television signal processing apparatus 12. The display 14 is operative to receive and show video from a video signal, video signals, or video information contained in various television signals received and/or processed by the television signal processing apparatus 12. The television signal processing apparatus 12 is in communication with a television signal source or television signal sources containing or having auxiliary information or data 16. Particularly, the television signal processing apparatus 12 has one or more inputs for television signals that carry auxiliary data. The television signal processing apparatus 12 is also in communication with a television signal source or television signal sources containing or having auxiliary information or data 18. Particularly, the television signal processing apparatus 12 has one or more inputs for television signals that do not carry auxiliary data.

The television signals that have auxiliary information or data 16 are typically standard definition television signals (SDTV), while the television signals that do not have auxiliary information or data 18 are typically enhanced performance television signals (high definition television signals, HDTV, or progressive-scan television signals). The television signal system 10 is thus configured, operative, and/or adapted to receive and/or process both standard definition and enhanced performance definition (e.g. high definition television or HDTV, and progressive scan television) signals.

Figure 2:
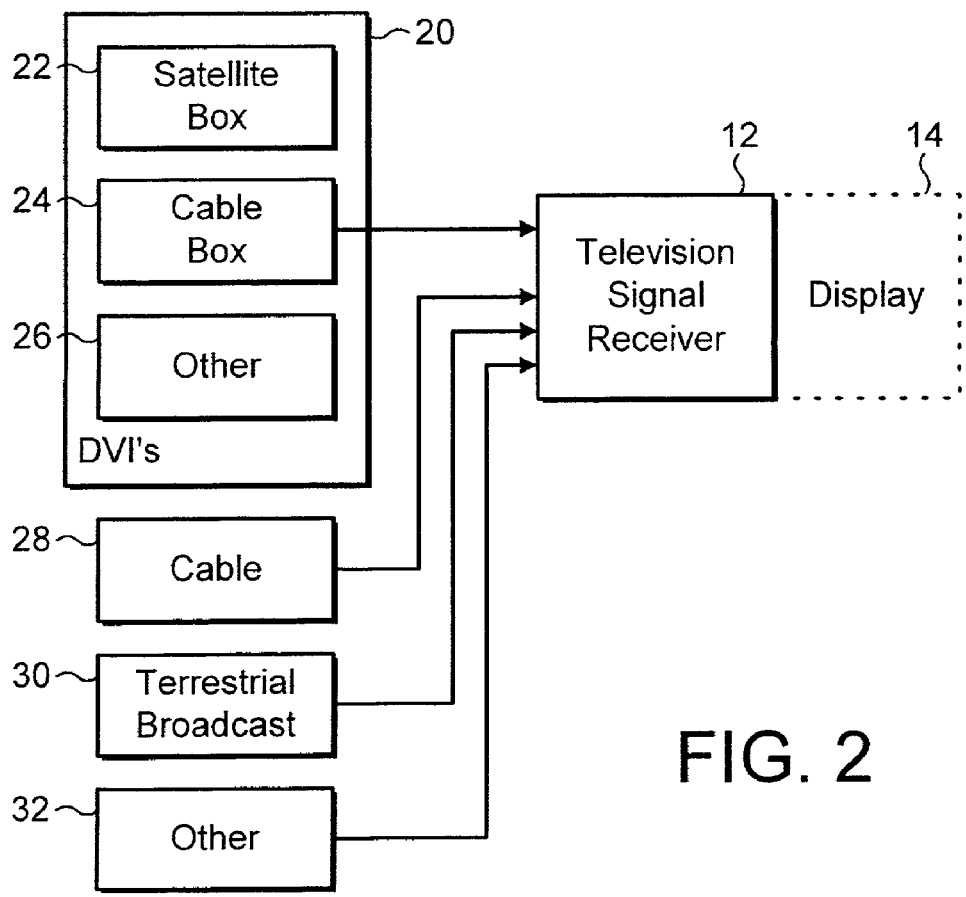
FIG. 2 is a block diagram of an exemplary television signal processing system in accordance with the principles of the subject invention.

In FIG. 2, various typical television signals, signal inputs, and/or signal sources are shown. Particularly, sources or inputs for the television signals that have auxiliary information or data 16 are shown as well as sources or inputs for the television signals that do not have auxiliary information or data 18 are shown. One category of television signal sources or inputs that do not provide auxiliary information or data are digital video interfaces (DVIs) 20. DVIs 20 encompass satellite boxes 22, cable boxes 24, and/or other types of set-top boxes and the like represented by box 26 labeled Other. Essentially, these devices either receive an enhanced performance television signal that lacks auxiliary information/data, or receive an enhanced performance television signal with auxiliary information/data but lack the capability to process and/or utilize the auxiliary information/data. Typically, such DVIs 20 do not have the capability to process and/or utilize auxiliary information/data in an enhanced performance television signal (e.g. HDTV signals, and progressive-scan signals).

Another category of television signal sources or inputs that do provide auxiliary information or data as part of the television signal are cable television 28, terrestrial broadcasting 30, and other analog or standard definition sources/inputs represented by box 32 labeled Other. These standard definition television sources or signal inputs provide a television signal with auxiliary information or data. The television signal processing apparatus 12 is thus configured to accept at least one enhanced performance or definition television signal (without auxiliary information/data) and at least one standard definition television signal (with auxiliary information/data).

The display or monitor 14 may or may not be integral with the television signal processing apparatus 12 as represented by the dashed lines in FIG. 2. Thus, the television signal processing apparatus 12 may take several forms such as a television (having an integral display 14) or other device not having an integral display 14.

The television signal processing apparatus 12 is operative to match, pair or correlate an enhanced performance/definition television signal (input) with or to a standard definition television signal (input). The television signal processing apparatus 12 preferably has multiple television signal inputs, some for high definition television signals and some for standard definition television signals. Each high definition television signal or signal input is thus correlated to a standard definition television signal or signal input. Such correlation may be accomplished through default set-up of the television signal processing apparatus, via a user-controlled set-up menu, or via information such as program guide data that is included in the television signal (program guide data may include, for example, information about the programming included on one or more channels including the signal format associated with the program). In any case, when a particular DVI input is selected, a composite standard definition television signal or input is selected for obtaining auxiliary information.

Control of the standard definition input signal selection (correlation) and routing may be accomplished via a default set-up. The default set-up provides for the television signal processing apparatus 12 to select an appropriate standard definition television signal to be paired with a high definition television signal. Thus, when a high definition television signal, program, or channel is selected for viewing (typically by the user via a remote control, not shown, or other device), the television signal processing apparatus 12 selects an appropriate standard definition television signal for obtaining the auxiliary information/data therefrom. Alternatively, a user-controlled set-up menu may be provided by the television signal processing apparatus 12. The user-controlled set-up menu may be operated through or by a remote control device or controller (not shown) through an on-screen display menu. The user-controlled set-up menu could allow each enhanced performance/definition television signal (i.e. progressive-scan or high definition) input to be paired with a standard definition input for obtaining auxiliary information/data (e.g. closed caption data).

Once set-up is complete, the system controller of the television signal processing apparatus 12 will route the correct auxiliary information/data to the appropriate components of the television signal processing apparatus 12 for processing. Pairing or correlating the high definition and standard television signals/inputs may also involve correlating television programs, broadcasters, or the like since the same television programming may not be provided on the same channel for the high definition television signal and the standard definition television signal.

Particularly, once the high definition television signal is paired with the standard definition television signal (or vice versa), once a high definition television channel or program is chosen by a user, a channel of the standard definition television signal carrying the same programming must be correlated to the high definition channel. This provides the necessary correlation in order to use the auxiliary information/data (e.g. closed caption information/data) from the standard definition television signal with or for the high definition television signal. In this case, there may be a need for a cross-reference database, look-up table, or the like in order to correlate television signal programming between the high definition television signals and the standard definition television signals. Such correlation may be automatic by the television signal processing apparatus 12 or be a part of the user-controlled set-up menu.

Additionally, providing the auxiliary information/data such as closed captioning may be optional. In this regard, the television signal processing apparatus 12 may allow user control of the closed captioning feature, i.e. whether closed captioning is displayed or not displayed. If closed captioning is enabled and a high definition television signal source is selected for viewing, closed captioning will be provided as detailed herein.

Figure 3:
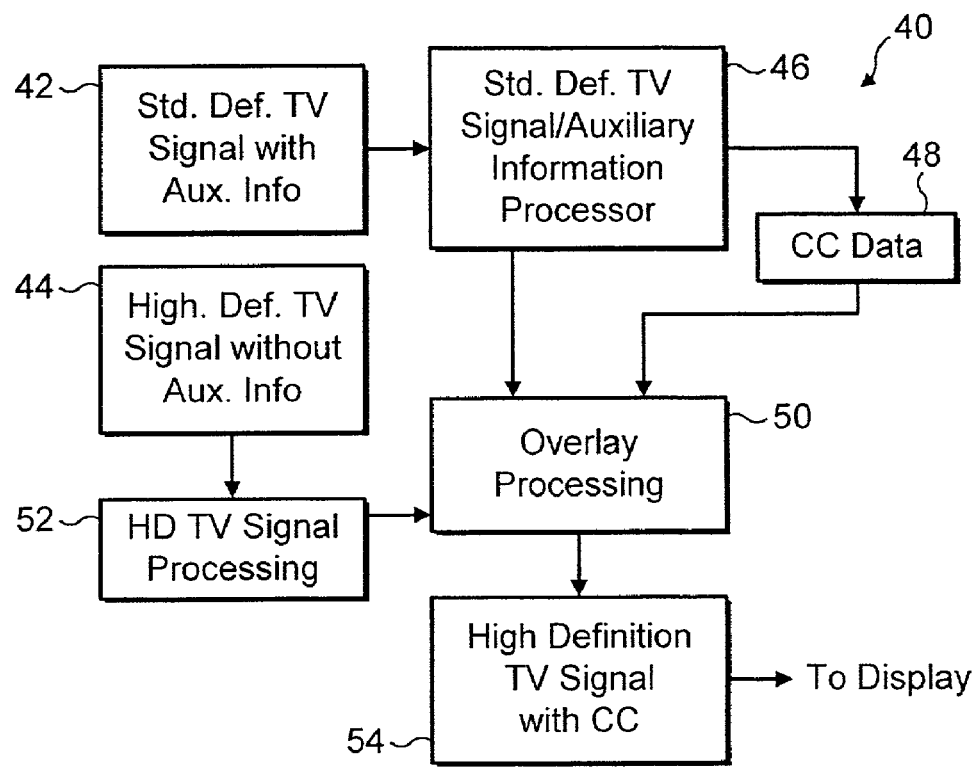
FIG. 3 is a block diagram of an exemplary television signal processing system in accordance with the principles of the subject invention.

To better explain the subject system, an exemplary system involving closed caption data will be described below. In this regard, reference is now made to FIG. 3. FIG. 3 depicts an exemplary television signal processing system generally designated 40. The television signal processing system 40 is preferably part of the television signal processing apparatus 12, but not necessarily. The television signal processing system 40 accepts a standard definition television signal having auxiliary information or data 42 and a high definition television signal lacking auxiliary information 44. A particular channel of television programming of the high definition television signal is chosen by the user. The particular high definition television program signal or channel is then processed by an HDTV signal processor, processor or processing circuitry/logic, and/or the like 52. The high definition television signal processor 52 is operative to obtain a signal representing and/or representative of a television program contained in the input or selected high definition television signal. The television program signal from the HDTV signal processor/processing 52 is provided to an overlay processor, processor or processing circuitry/logic, and/or the like 50.

The standard definition television signal/auxiliary information processor 46 is operative to extract auxiliary information/data, here closed caption information/data represented by the closed caption (CC) box 48. The standard definition television signal/auxiliary information processor 46 is further operative to obtain, generate, and/or produce a control signal, control signals, and/or control information/data. The control signal provides, at a minimum, timing information regarding the closed caption information/data. Blocks 46 and/or 52 may contain delay processes to properly align the HDTV signal to the auxiliary information. Both the closed caption information 48 and the control signal are provided to the overlay processor 50.

The overlay processor 50 is operative to process the high definition television signal received from the HDTV signal processor 52, the control signal/data received from the standard definition television signal/auxiliary information processor 46, and the closed caption data (text) 48 also received from the standard definition television signal/auxiliary information processor 46. Such processing includes overlaying the closed caption data 48 onto the high definition television signal or program. Particularly, the closed caption data is overlaid onto the high definition television program/signal at the video rate of the high definition television signal. This results in a high definition television signal (high definition television program) with closed caption data (text) represented by the block 54. The high definition television program with closed caption data is then provided to the display 14.

Figure 4:
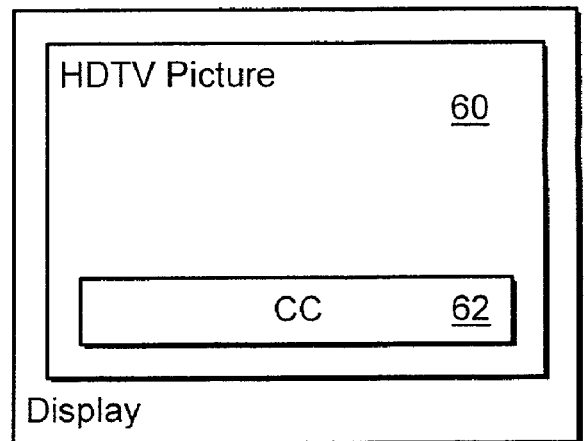
FIG. 4 is a depiction of a television signal display showing an HDTV signal with closed captioning.

Referring to FIG. 4, the display 14 is depicted showing an HDTV television program 60, the HDTV television program 60 from an HDTV signal lacking closed caption (auxiliary) information/data. In accordance with an aspect of the subject invention, closed captioning (CC) text 62 is overlaid onto the HDTV picture 60. This is assuming that closed caption is enabled. The CC text 62 is obtained from a standard definition television signal having closed captioning (auxiliary) information/data. Since the high definition television program 60 is correlated to the same television program as provided by a standard definition television signal, the closed captioning text 62 matches the high definition television program 60.

Figure 5:
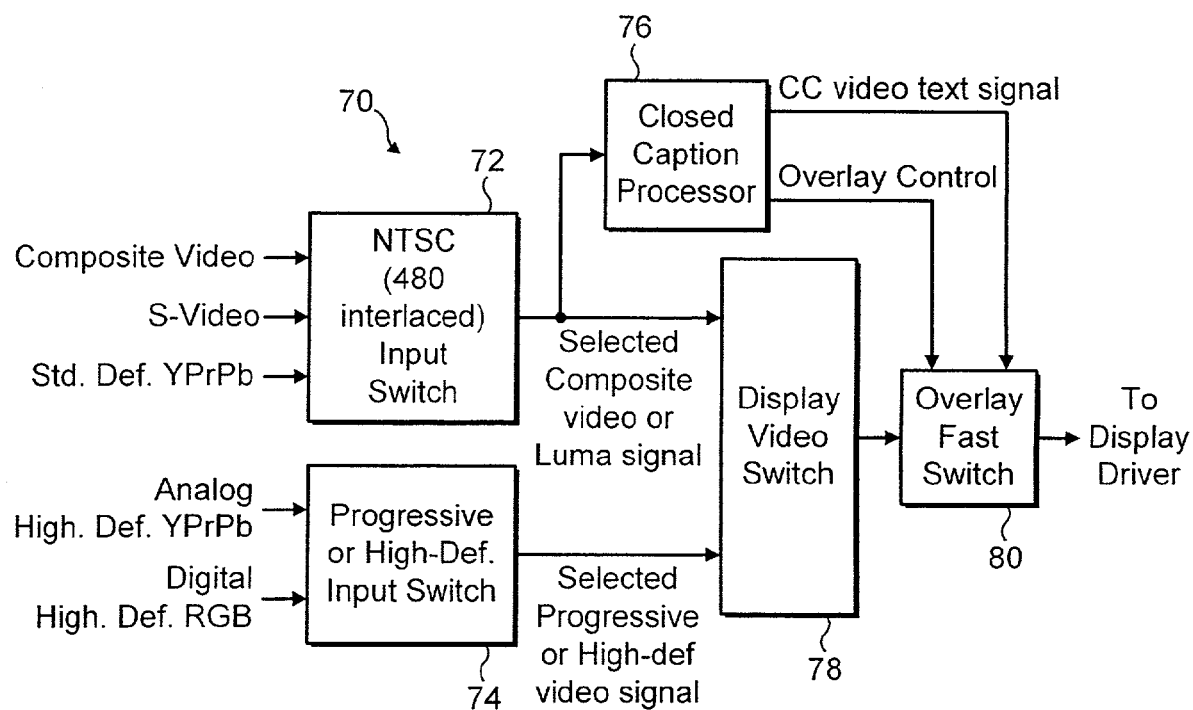
FIG. 5 is a block diagram of an exemplary television signal processing system in accordance with the principles of the subject invention.

Referring to FIG. 5, there is depicted an exemplary circuit, logic, and/or circuitry 70 in accordance with the principles of the subject invention. In this particular embodiment, the television signal source(s) with auxiliary information 16 comprise NTSC or standard definition television signals. The television signal source(s) without (lacking) auxiliary information 18 comprise progressive-scan or high definition television signals.

An NTSC (480 lines interlaced) input switch 72 is adapted to accept various types of standard definition NTSC video signals, namely a composite video signal, an S-video (component) signal, and a standard definition YPrPb video signal, each processed from a respective television signal. A progressive-scan or high definition input switch 74 is adapted to accept various types of high definition television signals, namely an analog high definition YPrPb video signal and a digital high definition RGB (or YCrCb) video signal, each processed from a respective television signal.

The progressive/high definition input switch 72 is operative to pass or output the selected high definition or progressive-scan video signal (typically a user selected HD or progressive-scan channel of programming, or a channel having a particular television program). The selected HD or progressive-scan television program or video signal is provided as an input to a display video switch 78.

Since the NTSC input switch 72 is utilized to provide selection of an NTSC television signal input regardless of whether auxiliary information is desired from the television signal, the NTSC input switch 72 is coupled to the display video switch 78. Thus, when an NTSC television signal or channel is selected for viewing, the display video switch 78 is controlled by the television signal processing apparatus 12 to allow the selected NTSC television signal to pass to the display 14. When a high definition television signal or channel is selected for viewing and the closed caption feature is enabled, the display video switch 78 is controlled to allow the selected high definition television signal to pass to the display 14.

The NTSC input switch 72 is also operative to pass or output the correlated standard definition video signal to a closed caption processor 76. The closed caption processor 76 is operative to extract closed caption information and provide a CC video text signal from the input video signal. The closed caption processor 76 may also include OSD generation capabilities. The video text signal is generated at the same rate as the selected high definition video signal rate. The closed caption processor 76 also provides an overlay control signal based on timing (video rate) information in the input video signal. The CC video text signal and the overlay control signal are both input to an overlay fast switch 80. As well, the selected high definition video signal from the display video switch 78 is input to the overlay fast switch 80. The overlay fast switch 80 overlays the closed caption video text signal containing the closed caption text onto the selected high definition video signal according to the overlay control signal. The combined video signal is then provided to a display driver (not shown) for display on the monitor/display 14.

The closed caption processor 76 is operative to interpret closed caption data in the input video signal. As well, text, color and placement information is determined by the closed caption processor 76. This must be transformed from the 480-line interlaced video format to that of the selected higher definition video (television) signal, such as a 480-line progressive-scan video signal or a 1080-line interlaced video signal. In one form, this may be accomplished by the closed caption processor as or including an OSD generator. The OSD generator would be slaved to the selected external input. The horizontal and vertical synchronizing signals are extracted from the external signal and input into the OSD generator. The signals force the OSD generator output to conform to the input.

Figure 6:
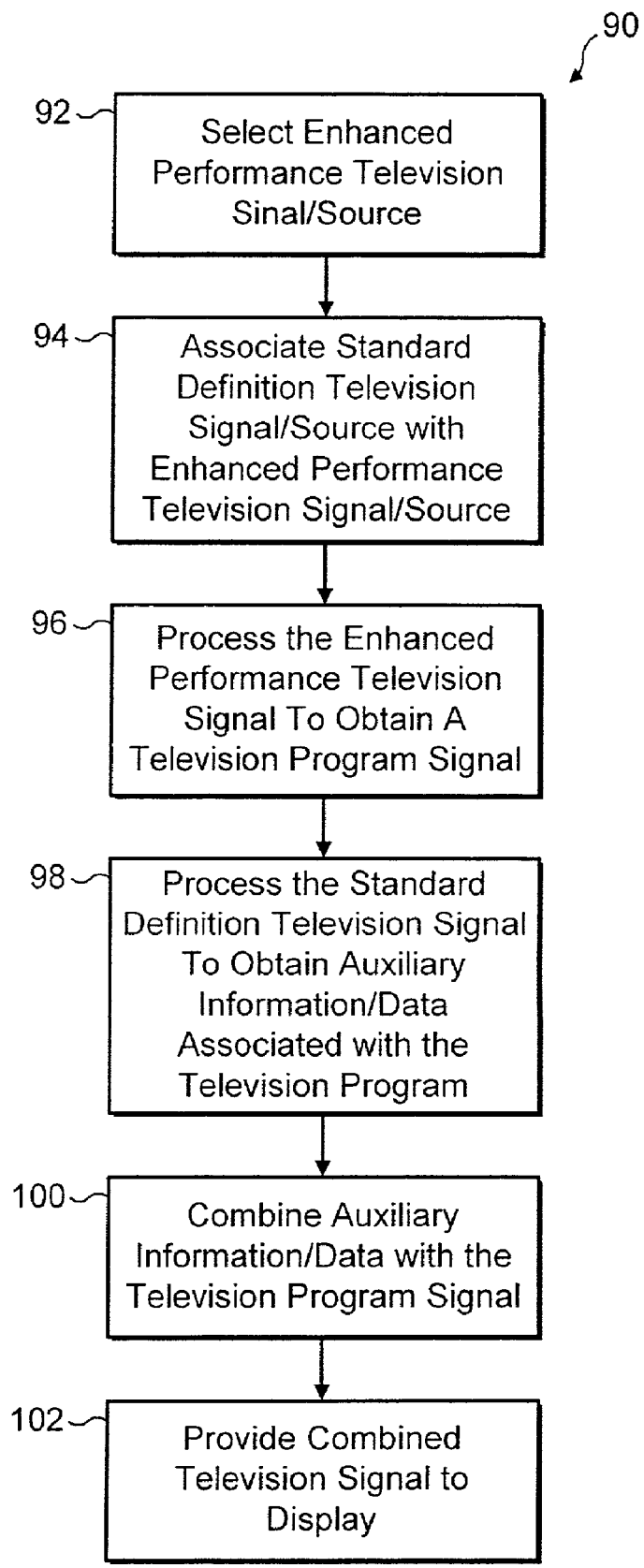
FIG. 6 is a flowchart of an exemplary manner of operation of an aspect of the subject invention.

Referring now to FIG. 6, there is depicted a flowchart, generally designated 90, illustrating an exemplary manner of operation of the subject invention in accordance with the subject principles. In step or block 92, an enhanced definition/performance television signal (e.g. a high or higher definition television signal) corresponding to a television channel that carries a television program is selected. This is typically accomplished by the user via a remote control (not shown) or the like, whose signals are received and interpreted by the television signal processing apparatus 12. It is assumed that auxiliary information (e.g. closed caption information) is desired. In step/block 94, a standard definition television signal is associated with the enhanced performance television signal. This may have already been accomplished via a default set-up, via a user defined set-up, or other manner. This step/block indicates either the ability to do so at this time, or the referencing and immediate association between the two television/video signals.

In step/block 96, the enhanced performance television signal is processed to obtain a television program signal. In step/block 98, the standard definition television signal is processed to obtain auxiliary information/data (e.g. closed caption information/data). Thereafter, in step/block 100, the auxiliary information/data is combined with the television program signal. The combined television program is then provided, in step/block 102, to the display.

This invention allows unique features to be enabled that would not be possible if the auxiliary information/data had been combined with the video at the source. For example, CC display on audio mute. This feature responds to the "audio mute" command (from remote control button push) by making the audio volume go to zero and also displaying closed captions automatically. When audio mute is disabled, normal audio volume returns and closed captions are turned off. Another example is selection of the HD video through guide information that links it to a known program from the associated NTSC channel.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

The invention claimed is:

1. In a television signal processing apparatus, a method for controlling display of video information comprising the steps of:

processing a first television signal of a first format lacking auxiliary information to provide a signal representing a first television program included in said first television signal of a first format lacking auxiliary information;

automatically correlating said first television signal of a first format lacking auxiliary information to a second television signal of a second format including auxiliary information, said auxiliary information included in said second television signal of a second format being associated with said first television program, upon user selection of said first television signal of a first format lacking auxiliary information;

processing said correlated second television signal of a second format to obtain said auxiliary information associated with said first television program; and combining the auxiliary information from the correlated second television signal of a second format with said signal representing a first television program from said first television signal of a first format lacking auxiliary information to produce a combined video signal representing a displayable image that includes said first television program from said first television signal of a first format lacking auxiliary information and the auxiliary information from said correlated second television signal of a second format.

2. The method of claim 1, wherein the step of processing the second television signal of the second format to obtain auxiliary information associated with the first television program includes the step of obtaining closed caption information.

3. The method of claim 1, wherein the step of processing the second television signal of the second format comprises the step of processing a standard definition format television signal.

4. The method of claim 3, wherein the step of processing the standard definition format television signal includes the step of processing an NTSC format television signal.

5. The method of claim 1, wherein the step of processing the first television signal of the first format includes the step of processing a high definition television signal.

6. The method of claim 5, wherein the step of processing the high definition television signal includes the step of processing one of a progressive-scan television signal, a digital high definition RGB/television signal, and a digital high definition YCrCb television signal.

7. The method of claim 1, wherein the step of combining the auxiliary information associated with said first television program from the second television signal of the second format with the signal representing the first television program from the first television signal of the first format to produce a combined video signal representing a displayable image that includes the television program and the auxiliary information includes the step of overlaying the auxiliary information from the second television signal associated with said first television program of the second format onto the signal representing the first television program.

8. A television signal processing apparatus comprising:
means for processing a first television signal of a first format lacking auxiliary information to provide a signal representing a first television program included in the first television signal of a first format lacking auxiliary information;
means for processing a second television signal of a second format to obtain auxiliary information associated with the first television program;
means for automatically correlating said first television signal of said first format lacking auxiliary information to said auxiliary information associated with said first television program of said second television signal of a second format upon user selection of the first television signal of a first format lacking auxiliary information; and
means for combining the auxiliary information from the second television signal of the second format with the signal representing a first television program from the first television signal of the first format lacking auxiliary information to produce a combined video signal representing a displayable image that includes the television program from said first television signal of a first format lacking auxiliary information and the auxiliary information from said correlated second television signal of a second format.

9. The television signal processing apparatus of claim 8, wherein the means for processing the second television signal of the second format to obtain auxiliary information associated with the first television program includes means for obtaining closed caption information.

10. The television signal processing apparatus of claim 8, wherein the means for processing the second television signal of the second format comprises means for processing a standard definition format television signal.

11. The television signal processing apparatus of claim 10, wherein the means for processing the standard definition format television signal includes means for processing an NTSC format television signal.

12. The television signal processing apparatus of claim 8, wherein the means for processing the first television signal of the first format includes means for processing a high definition television signal.

13. The television signal processing apparatus of claim 12, wherein the means for processing the high definition television signal includes means for processing one of a progressive-scan television signal, a digital high definition RGB television signal, and a digital high definition YCrCb television signal.

14. The television signal processing apparatus of claim 8, wherein the means for combining the auxiliary information associated with said first television program from the second television signal of the second format with the signal representing the first television program from the first television signal of the first format to produce a combined video signal representing a displayable image that includes the television program and the auxiliary information includes means for overlaying the auxiliary information associated with said first television program from the second television signal of the second format onto the signal representing a television program.

15. A television signal processing apparatus comprising:
a first processor operative to receive and process a first television signal of a first format lacking auxiliary information to provide a signal representing a first television program included in the first television signal of a first format lacking auxiliary information;
a second processor operative to receive and process a second television signal of a second format to obtain auxiliary information associated with the first television program;
a correlator for automatically correlating said first television signal of said first format lacking auxiliary information with said second television signal of said second format having auxiliary information associated with said first television program upon user selection of the first television signal of a first format lacking auxiliary information; and
a combiner in communication with the first and second processors and operative to combine the auxiliary information of the correlated second television signal of a second format associated with said first television program with the signal representing the first television signal of the first format lacking auxiliary information to produce a combined video signal representing a displayable image that includes the first television program from said first television signal of a first format lacking auxiliary information and the associated auxiliary information from said correlated second television signal of a second format.

16. The television signal processing apparatus of claim 15, wherein the second processor includes a closed caption processor.

17. The television signal processing apparatus of claim 15, wherein the second processor includes a standard definition format television signal processor.

18. The television signal processing apparatus of claim 17, wherein the standard definition format television signal processor includes an NTSC format television signal processor.

19. The television signal processing apparatus of claim 15, wherein the first processor includes a high definition television signal processor.

20. The television signal processing apparatus of claim 19, wherein the high definition television signal processor includes one of a progressive-scan television signal processor, a digital high definition RGB television signal processor, and a digital high definition YCrCb television signal processor.

21. The television signal processing apparatus of claim 15, wherein the combiner includes an overlay fast switch operative to overlay the auxiliary information associated with said first television program from the second television signal of the second format onto the signal representing the first television program.

22. The television signal processing apparatus of claim 15, wherein the auxiliary information associated with said first television program from the second television signal of the second format comprises program guide data and the program guide data is used to select the first television signal of the first format based on an association with a program on the second television signal of the second format.

23. The television signal processing apparatus of claim 16, wherein the closed caption information is overlaid when an audio mute command is received and the closed caption information is not overlaid when the audio mute is turned off.

24. The television signal processing apparatus of claim 15, wherein the HDTV signal processing and/or the auxiliary information processor contains delay processing to align the video and the data before sending to the overlay processing.

* * * * *